United States Patent
Becker et al.

(10) Patent No.: US 8,423,962 B2
(45) Date of Patent: *Apr. 16, 2013

(54) AUTOMATED TEST EXECUTION PLAN GENERATION

(75) Inventors: Jennifer G. Becker, Research Triangle Park, NC (US); Kenneth L. McClamroch, Research Triangle Park, NC (US); Vinodkumar Raghavan, Lexington, MA (US); Peter Sun, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 723 days.

This patent is subject to a terminal disclaimer.

(21) Appl. No.: 12/575,602

(22) Filed: Oct. 8, 2009

(65) Prior Publication Data

US 2011/0088014 A1    Apr. 14, 2011

(51) Int. Cl.
    G06F 9/44    (2006.01)
    G06F 9/445   (2006.01)
(52) U.S. Cl.
    USPC .................................... 717/124; 717/175
(58) Field of Classification Search ............ 717/124, 717/175
    See application file for complete search history.

(56) References Cited

U.S. PATENT DOCUMENTS

| | | | |
|---|---|---|---|
| 6,243,835 B1 | 6/2001 | Enokido et al. | |
| 6,546,506 B1 | 4/2003 | Lewis | |
| 7,124,401 B2 * | 10/2006 | Muller et al. | 717/124 |
| 7,272,752 B2 | 9/2007 | Farchi et al. | |
| 7,305,654 B2 | 12/2007 | Patel et al. | |
| 7,337,432 B2 | 2/2008 | Dathathraya et al. | |
| 7,581,138 B2 | 8/2009 | Bartucca et al. | |
| 2004/0143819 A1 | 7/2004 | Cheng et al. | |
| 2005/0160321 A1 | 7/2005 | Cleaveland et al. | |
| 2005/0172270 A1 * | 8/2005 | Dathathraya et al. | 717/124 |
| 2005/0204201 A1 | 9/2005 | Meenakshisundaram et al. | |
| 2006/0010448 A1 | 1/2006 | Sathe | |
| 2007/0079189 A1 | 4/2007 | Jibbe | |

(Continued)

OTHER PUBLICATIONS

Bai, et al., "A Multi-Agent Based Framework for Collaborative Testing on Web Services," Proc. Of 4th IEEE Workshop on Software Technologies for Future Embedded and Ubiquitous Systems and 2nd Int'l Workshop on Collaborative Computing, Integration and Assurance (SEUS-WCCIA '06), 2006.

(Continued)

*Primary Examiner* — Hyun Nam
(74) *Attorney, Agent, or Firm* — Patents on Demand P.A.; Brian K. Buchheit; Scott M. Garrett

(57) ABSTRACT

A set of user-configured testing parameters for a software application under test can be received by a test execution plan generation tool. At least one testing objective for the software application can be defined by user-configurable testing parameters. A test execution plan can be automatically generated utilizing the user-configured testing parameters and a predefined test execution plan data model. The predefined test execution plan data model can include testing metadata representing software testing domain data for a software testing system being used to evaluate the software application under test. The testing metadata can specify details of finite shared resources of a test center shared by all projects under test. The generated test execution plan can detail specific allocation of the finite shared resources dedicated towards at least one phase of testing the software application to satisfy the at least one testing objective for the software application.

14 Claims, 3 Drawing Sheets

U.S. PATENT DOCUMENTS

| | | |
|---|---|---|
| 2007/0094542 A1 | 4/2007 | Bartucca |
| 2008/0120521 A1 | 5/2008 | Poisson et al. |
| 2008/0256517 A1 | 10/2008 | Atkin et al. |
| 2009/0183143 A1 | 7/2009 | Li et al. |
| 2009/0199160 A1 | 8/2009 | Vaitheeswaran et al. |

OTHER PUBLICATIONS

Laurent, et al., "A Methodology for Automated Test Generation Guided by Functional Coverage Constraints at Specification Level," 21st IEEE Int'l Conference on Automated Software Engineering (ASE '06), 2006.

Lugato, et al., "Automated Functional Test Case Synthesis from THALES Industrial Requirements," Proc. of 10th IEEE Real-Time and Embedded Technology and Applications Symposium (RTAS '04), 2004.

Mayrhauser, et al., "Generating Test-Cases from an Object-Oriented Model with an Artificial-Intelligence Planning System," IEEE Transactions on Reliability, vol. 49, No. 1, pp. 26-36, Mar. 2000.

Kim, et al., "The Role of Design Components in Test Plan Generation," [online] J. Bosch (Ed.): GCSE 2001, LNCS 2186, pp. 140-152, 2001, [retrieved Oct. 8, 2009] retrieved from the Internet: <http://www.springerlink.com/content/w88217238jg24k8p/fulltext.pdf?page=1>.

Mihajlovic, et al., "A Knowledge-based Test Plan Generator for Incremental Unit and Integration Software Testing," [online] Software Testing, Verification and Reliability, vol. 8, No. 4, pp. 191-211, Published Online: Feb. 25, 1999 [retrieved Oct. 8, 2009] retrieved from the Internet: <http://www3.interscience.wiley.com/journal/40007260/abstract?CRETRY=1 &SRETRY=0>.

Prasanna, et al., "A Survey on Automatic Test Case Generation," [online] Academic Open Internet Journal, vol. 15, 2005 [retrieved Oct. 8, 2009] retrieved from the Internet: <http://www.acadjournal.com/2005/v15/part6/p4/>.

* cited by examiner

AUTOMATED TEST EXECUTION PLAN GENERATION

BACKGROUND

The present invention relates to the field of software testing and, more particularly, to automated test execution plan generation.

Software testing is a critical element of software development. A variety of automated software tools exist to assist in the management and/or performance of software testing. For example, an automated testing tool executes predefined scripts that simulate software usage. Other tools focus on the generation of various testing process artifacts, such as test cases and project timelines.

However, in spite of these tools, conventional creation of test execution plans is still a manual process. Generation of a test execution plan requires the consideration of many factors, which are often stored in systems that are external to the software testing system. For example, determining the availability of software testers would require consulting a project management and/or calendar program, whereas the testing-related information is contained within the software testing system.

Due to its manual nature, this process is time-consuming and easily subjected to human errors. It is possible for different personnel to generate differing test execution plans based on the same data and parameters. Further, the different test execution plans can be stored in dissimilar formats. This lack of standardization inhibits meaningful analysis of the test execution plans and their contents, such as determining gaps in testing coverage.

SUMMARY

The present disclosure provides a solution that can automatically generate a test execution plan for software testing. Generation of the test execution plan can be performed by a test execution plan generation tool. The test execution plan generation tool can utilize a predefined test execution plan data model in conjunction with user-configured testing parameters. The predefined test execution plan data model can contain testing metadata that represents the software testing domain data of the software testing system being used to evaluate the software application under test. The user-configured testing parameters can provide the specific testing parameters for the test execution plan.

One aspect of the present invention can include a method and computer program product for automatically generating test execution plans. A set of user-configured testing parameters for a software application under test can be received by a test execution plan generation tool. For example, a graphical user interface can be presented on a client that accepts user input within interface defined graphical user interface fields, where the user input specifies the testing parameters, which are conveyed to a server, hosting the text execution plan generation tool. The user-configured testing parameters can correlate to at least one item contained in a predefined test execution plan data model associated with the test execution plan generation tool. At least one testing objective for the software application can be defined by the user-configurable testing parameters. A test execution plan can be automatically generated utilizing the user-configured testing parameters and a predefined test execution plan data model. The predefined test execution plan data model can include testing metadata representing software testing domain data for a software testing system being used to evaluate the software application under test. The testing metadata can specify details of finite shared resources of a test center shared by all projects under test. The generated test execution plan can detail specific allocation of the finite shared resources dedicated towards at least one phase of testing the software application to satisfy the at least one testing objective for the software application.

Another aspect of the present invention can include a system for automatically generating test execution plans. Such a system can include user-configured testing parameters, a predefined test execution plan data model, and a test execution plan generation tool. The user-configured testing parameters can define testing requirements for a software application under test to be evaluated within a software testing system. At least one testing objective for a software application can be defined by the user-configurable testing parameters. The predefined test execution plan data model can define testing metadata for generating a test execution plan for the software application under test. The testing metadata can be representative of the software testing domain data of the software testing system. The testing metadata can specify details of finite shared resources of a test center shared by all projects under test, where the generated test execution plan details specific allocation of the finite shared resources dedicated towards at least one phase of testing the software application to satisfy the at least one testing objective for the software application. The test execution plan generation tool can be configured to automatically generate the test execution plan for the software application under test utilizing the user-configured testing parameters and the predefined test execution plan data model. Each generated test execution plan can include specific allocations of the finite shared resources dedicated towards at least one phase of testing the software application to satisfy the at least one testing objective for the software application.

DETAILED DESCRIPTION

Figure 1:
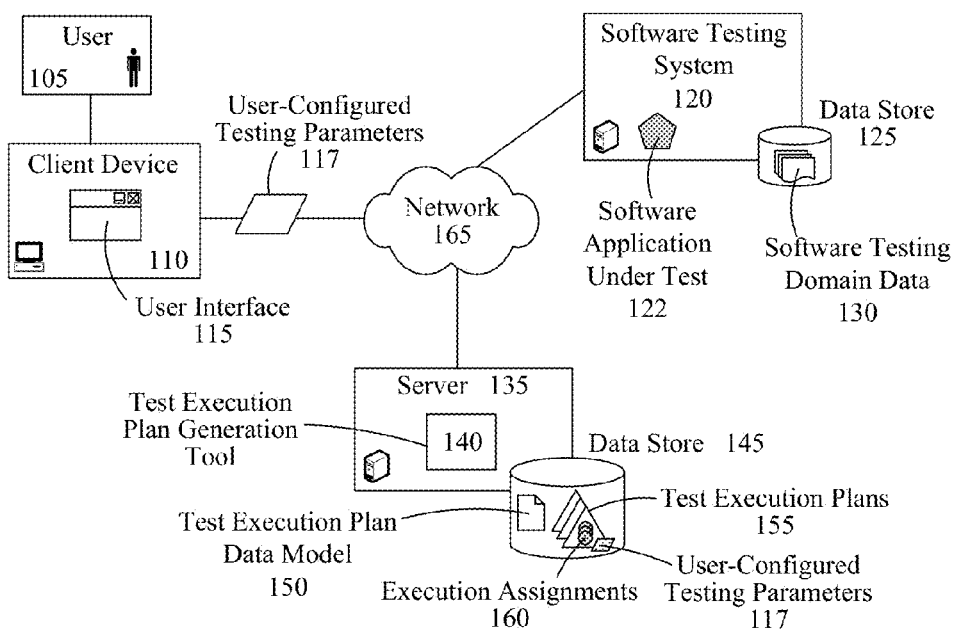
FIG. 1 is a schematic diagram illustrating a system that utilizes a test execution plan generation tool to automatically generate a test execution plan for a software application under test in accordance with embodiments of the inventive arrangements disclosed herein.

The disclosure provides a solution for computer generated, data-driven test execution plans (e.g., test execution assignments) that satisfy desired test coverage objectives and that utilize a finite set of shared resources for testing. Data (which can include static and dynamic data) concerning the finite set of shared testing resources can be persistent in a non-volatile memory and combined with user-configurable test specific parameters, where this data determines an allocation of the shared testing resources given an overall test load. The overall test load can include a set of pending test actions needed for multiple concurrent projects, which can be independent of each other.

In one embodiment, the solution can model tester and test case profiles, can maintain test quality metrics, and include test environment data, which are data elements utilized when generating data driven test execution plans. Further, the solution can integrate with existing test tracking tools, scheduling tools, resource management systems, project management systems, and the like, which permits the test execution plan generator to leverage existing information to significantly reduce tool-specific overhead and maintenance actions.

A test plan generator of the solution can be sufficiently robust to handle a myriad of variables that factor into identifying an appropriate set of test cases that should be included within a generated test plan. These variable can include, but are not limited to, desired test environment coverage (i.e., which depending on a product under test can include specialized resources utilizing a specific OS platform, database, application server, etc.), desired product coverage (e.g., acceptance test, regression, full product coverage, etc.), desired component coverage (e.g., adjust testing based on past quality metrics per component, target objects of a test, etc.), tester availability and skill level, and the like.

In one embodiment, the solution can include logging and analysis functionality, which persists generated plans. The analysis function can be used to detect any coverage gaps in a series of test plans constituting a project test plan to ensure a project has been comprehensively tested. Additionally, the storing and analyzing of plans can be used to establish a feedback/training loop, which can be used to automatically adjust behavior of the test execution plan generator to ensure generated plans are self-adapting over time.

Use of the disclosed solution can eliminate errors often caused by manually creating test execution plans. Additionally, managers in charge of testing can be granted a new ability to easily regenerate plans with variations to determine optional test approaches with understood risks. Each generated test plan can be fully customizable based upon multiple user-configurable criteria. Further, test plans can automatically adapt themselves based upon changes in available test resources, changing test objectives, and changing priorities between a set of concurrent projects under test.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that utilizes a test execution plan generation tool 140 to automatically generate a test execution plan 155 for a software application under test 122 in accordance with embodiments of the inventive arrangements disclosed herein. In system 100, the user 105 can utilize a user interface 115 running on a client device 110 to provide the test execution plan generation tool 140 with user-configured testing parameters 117.

The client device 110 can represent a variety of computing devices capable of running the user interface 115 and communicating with the test execution plan generation tool 140 over the network 165. The user-configured testing parameters 117 can represent the testing requirements for a software application under test 122. Examples of user-configured testing parameters 117 can include, but are not limited to, the name of the software application under test, the version of the software application under test, the test type (e.g., regression test, acceptance test, etc.), the testing environment, the names of software testers to perform the testing, skills required of unnamed software testers, the name of specific application component to be tested, the test coverage distribution, the testing start date, the test duration, test priority, test level of importance, and the like.

The user-configured testing parameters 117 can be conveyed over the network 165 to the server 135 upon which the test execution plan generation tool 140 can operate from. The test execution plan generation tool 140 can include a software application configured to automatically generate a test execution plan 155 based on the user-configured testing parameters 117 and a test execution plan data model 150. The test execution plan generation tool 140 can include a data store 145 for storage of the test execution plan data model 150 and generated test execution plans 155.

The test execution plan data model 150 can contain testing metadata that represents the software testing domain data 130 of the software testing system 120 in which the software application under test 122 can be evaluated. For example, the test execution plan data model 150 can contain key points of information regarding the test cases, testing environment, software testers, and component architecture of the software application under test 122 and/or software testing system 120.

Population of the test execution plan data model 150 can be performed manually by a user 105 via the user interface 115. Alternately, the test execution plan generation tool 140 can include automated data retrieval scripts (not shown) that can automatically collect the specified data elements of the test execution plan data model 150 from the data store 125 that stores the software testing domain data 130.

In another contemplated embodiment, the server 135 hosting the test execution plan generation tool 140 can be a component of the software testing system 120.

Upon receipt of the user-configured testing parameters 117, the test execution plan generation tool 140 can use the test execution plan data model 150 to generate execution assignments 160. An execution assignment 160 can represent a grouping of testing metadata from the test execution plan data model 150 defining a specific testing activity that satisfies the user-configured testing parameters 117. For example, an execution assignment 160 can indicate that Tester A is to execute Test Case J, using Computer C between Times T1 and T2.

The execution assignments 160 can be aggregated to produce the test execution plan 155. The test execution plan 155 can be stored with its corresponding user-configured testing parameters 117 in the data store 145. Since the test execution plans 155 are generated using a standardized process, the test execution plan generation tool 140 can be further configured to perform analysis functions upon the history of test execution plans 155.

It should be noted that conventional methods for generating test execution plans 155 are performed manually. As such, conventional methods tend to lack the standardization and efficiency of an automated test execution plan generation tool 140.

Network 165 can include any hardware/software/and firmware necessary to convey data encoded within carrier waves. Data can be contained within analog or digital signals and conveyed though data or voice channels. Network 165 can include local components and data pathways necessary for communications to be exchanged among computing device components and between integrated device components and peripheral devices. Network 165 can also include network equipment, such as routers, data lines, hubs, and intermediary servers which together form a data network, such as the Internet. Network 165 can also include circuit-based communication components and mobile communication components, such as telephony switches, modems, cellular communication towers, and the like. Network 165 can include line based and/or wireless communication pathways.

Data stores 125 and 145 can be a physical or virtual storage space configured to store digital information. Data stores 125 and 145 can be physically implemented within any type of hardware including, but not limited to, a magnetic disk, an optical disk, a semiconductor memory, a digitally encoded plastic memory, a holographic memory, or any other recording medium. Data stores 125 and 145 can be a stand-alone storage unit as well as a storage unit formed from a plurality of physical devices. Additionally, information can be stored within data stores 125 and 145 in a variety of manners. For example, information can be stored within a database structure or can be stored within one or more files of a file storage system, where each file may or may not be indexed for information searching purposes. Further, data stores 125 and/or 145 can utilize one or more encryption mechanisms to protect stored information from unauthorized access.

The client device 110, software testing system 120, and server 135 can each include hardware, software, and/or firmware components. The components can be implemented in a set of one or more computing devices. For example, system 120 can include a set of multiple computing devices, which are configured for specific test environments. In another example, server 135 can be implemented in a distributed computing space or within a single device. The hardware included in device 110, system 120, and/or server 135 can include at least one processor, a volatile memory, a nonvolatile memory, and a network adaptor linked to each other via a communication bus.

Figure 2:
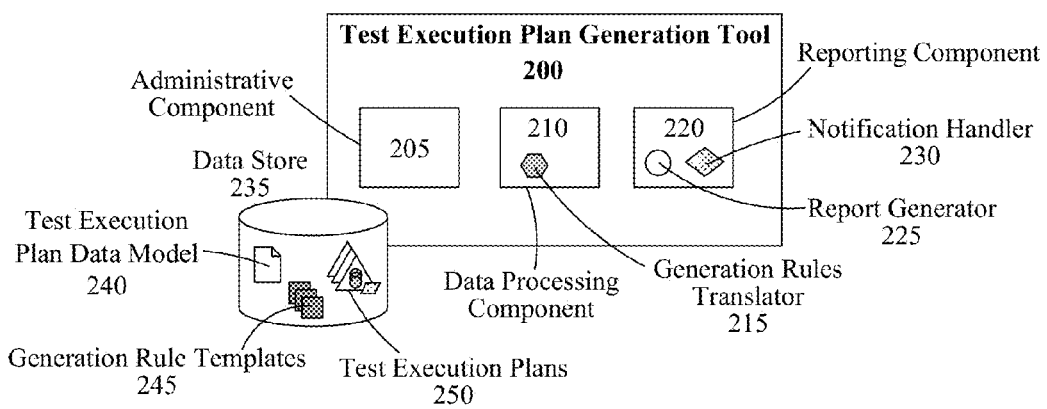
FIG. 2 is a detailed illustration of the test execution plan generation tool in accordance with an embodiment of the inventive arrangements disclosed herein.

FIG. 2 is a detailed illustration of the test execution plan generation tool 200 in accordance with embodiments of the inventive arrangements disclosed herein. The test execution plan generation tool 200 can be utilized within the context of system 100.

The test execution plan generation tool 200 can include an administrative component 205, a data processing component 210, a reporting component 220, and a data store 235 containing the test execution plan data model 240, generation rule templates 245, and test execution plans 250. The administrative component 205 can be configured to provide administrative functions for the test execution plan generation tool 200. For example, functions of the administrative component 205 can be used when populating the test execution plan data model 240 and/or generation rules templates 245.

The data processing component 210 can be configured to perform a variety of data analysis and data synthesis operations upon the test execution plan data model 240 and/or stored test execution plans 250. The data processing component 210 can include a generation rules translator 215. The generation rules translator 215 can represent a software component and/or algorithm configured to translate the received user-configured testing parameters into generation rules that can be executed by the test execution plan generation tool 200.

For example, user-configured testing parameters indicating that the test execution plan 250 is to be generated for Application Z, version 2.4 can be translated into a generation rule stating that the test execution plan data model 240 should be queried for records where Product=Application Z AND Version=2.4. 'Product' and 'Version' can correspond to data elements contained within the test execution plan data model 240.

The generation rules translator 215 can bridge differences in nomenclature presented in the user interface of the test execution plan generation tool 200 and the test execution plan data model 240. As shown in the above example, the generation rules created by the generation rules translator 215 can include BOOLEAN logic for querying the test execution plan data model 240.

Additionally, the data processing component 210 can prioritize the generation rules in accordance with user-defined priority values. This prioritization can affect the order in which the generation rules are executed and/or stressed during generation of the test execution plan 250.

Further, the data processing component 210 and/or generation rules translator 215 can be configured to utilize generation rules templates 245. The generation rules templates 245 can represent user-customizable groups of generation rules related to a specific value of a testing parameter. For example, generation rules templates 245 can be created to define testing parameter data values and/or required generation rules for different types of software testing, such as acceptance testing and regression testing.

The generation rules templates 245 can be selectable from the user interface of the test execution plan generation tool 200. Selection of a generation rules template 245 can automatically populate the defined testing parameters and/or generation rules with the preset data values.

The reporting component 220 can be configured to aggregate the stored data into user-specified report formats. The reporting component 220 can include a report generator 225 and a notification handler 230. The report generator 225 can be configured to allow the definition and generation of reports for the test execution plan data model 240, generation rule templates 245, and/or history of test execution plans 250. The report generator 225 can utilize the functions of the data processing component 210 to gather report data.

The notification handler 230 can be a component configured to distribute information to users. For example, the notification handler 230 can send electronic notification messages to software testers containing execution assignment information. The notification handler 230 can be further configured to interface with various electronic messaging systems to provide additional notification options.

Figure 3:
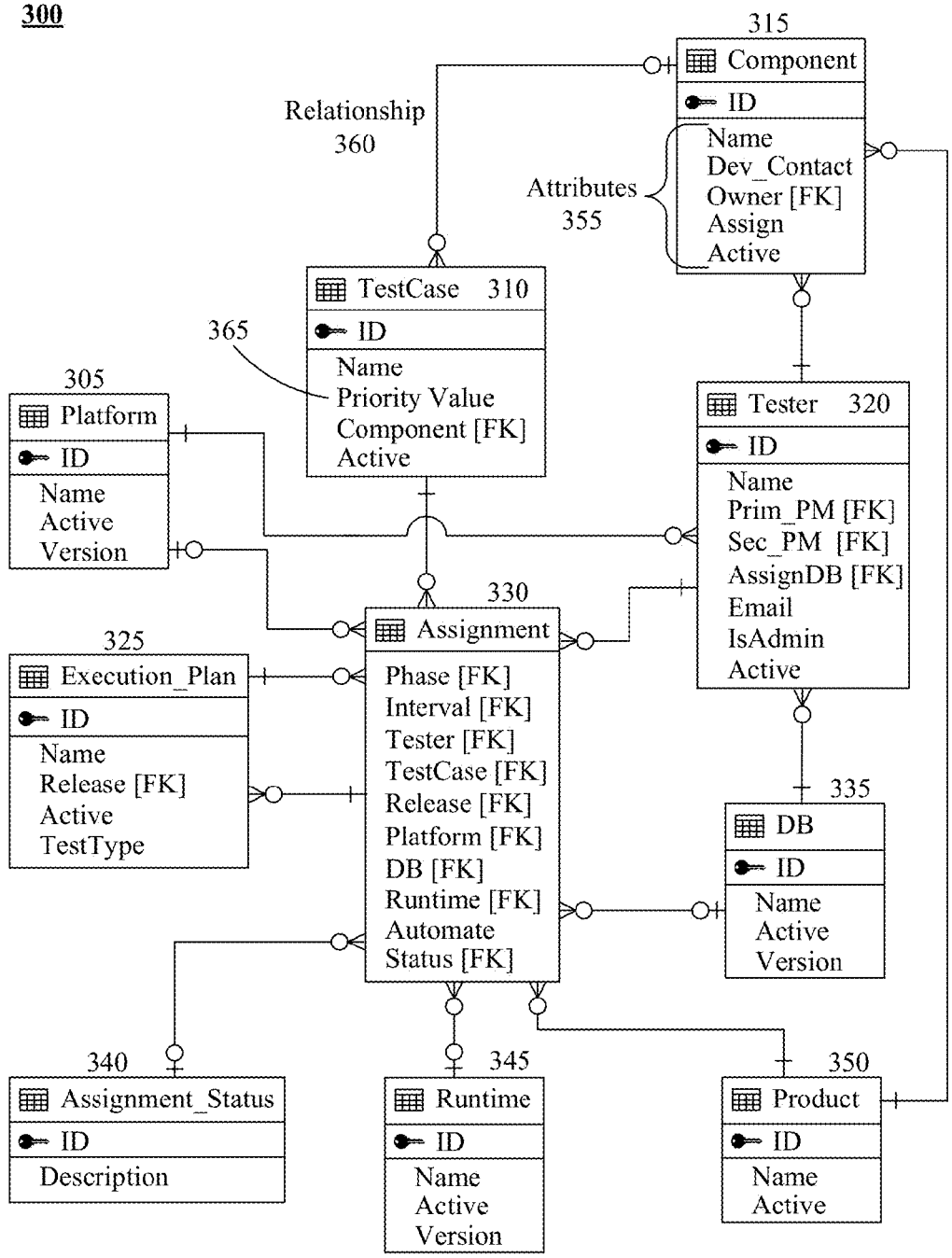
FIG. 3 is a sample database schema for a test execution plan data model in accordance with embodiments of the inventive arrangements disclosed herein.

FIG. 3 is a sample database schema 300 for a test execution plan data model in accordance with embodiments of the inventive arrangements disclosed herein. Sample database schema 300 can be utilized within the context of system 100 and/or by test execution plan generation tool 200 of FIG. 2.

It should be noted that the contents of the sample database schema 300 are for illustrative purposes only, and are not meant to present a definitive implementation. As shown, schema 300 has been reduced to third normal form, as it a standard when modeling database structures, which is not to be construed as an implementation limitation. Further, one of ordinary skill can base a different schema off the relationships expressed in the illustrative one 300, yet still be considered within scope of the present disclosure.

As shown in the sample database schema 300, the test execution plan data model can include multiple database tables 305-350 that can have one or more attributes 355 defining testing metadata. An attribute of particular note is the 'Priority Value' attribute 365 of the testcase table 310. This attribute 365 can provide user-defined prioritization input to influence test execution plan generation.

The database tables 305-350 can be associated with each other via relationships 360. The relationships 360 can follow accepted database modeling conventions, such as the inclusion of cardinality using Crow's Foot notation shown in this example.

The sample database schema 300 can be read as follows. A product 350 can have many components 315 and many assignments 330. One or more test cases 310 can exist to provide test coverage for a given component 315 (or functional area) of a product 350. One or more assignments 330 can be created to satisfy test objectives of providing test coverage (for specific test cases 310) for a given product 350/component 315 under test (e.g., across the supported execution domain for the set of operating systems (305), databases (335), runtimes (345), etc.). A tester 320 can be responsible for each assignment 330, which can have an associated assignment status 340.

As shown by schema 300, a component 315 can have many testcases 315 and many components 315 can be associated with one tester 320. Many testers 320 can be associated with a platform 305 and a database (DB) 335. One testcase 315 can have many assignments 330. Many assignments 330 can belong to one execution_plan 325 and a single assignment 330 can belong to many execution_plans 325. Many assignments 330 can have an associated assignment status 340, runtime 345, product 350, DB 335, tester 320, and platform 305.

Figure 4:
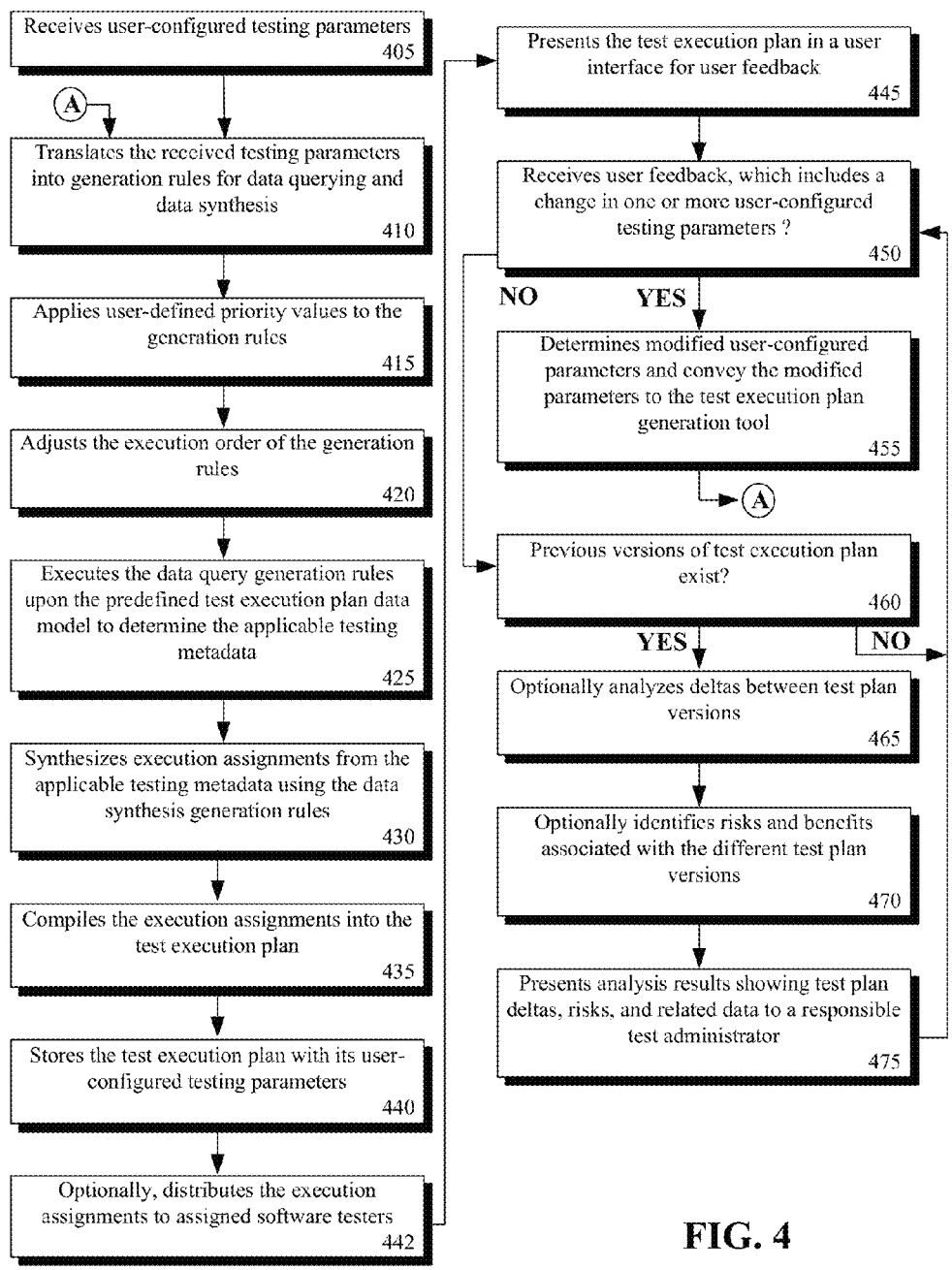
FIG. 4 is a flow chart of a method that describes the automatic generation of a test execution plan performed by a test execution plan generation tool in accordance with embodiments of the inventive arrangements disclosed herein.

FIG. 4 is a flow chart of a method 400 that describes the automatic generation of a test execution plan performed by a test execution plan generation tool in accordance with an embodiment of the inventive arrangements disclosed herein. Method 400 can be performed by system 100, the test execution plan generation tool 200, and/or utilizing the sample database schema 300.

Method 400 can begin with step 405 where the test execution plan generation tool can receive user-configured testing parameters. The received user-configured testing parameters can be translated into generation rules in step 410. The generation rules can include data querying and/or data synthesis rules.

In step 415, user-defined priority values can be applied to the generation rule. The execution order of the generation rules can be adjusted in step 420. The data query generation rules can be executed upon the predefined test execution plan data model in step 425 to determine the applicable testing metadata.

In step 430, the applicable testing metadata can be synthesized into execution assignments using the data synthesis generation rules. The execution assignments can then be compiled into the test execution plan in step 435. In step 440, the test execution plan can be stored with its user-configured testing parameters. In optional step 442, the execution assignments can be distributed to assigned software testers.

The test execution plan can be presented within the user interface for user feedback in step 445. For example, testers can open a feedback interface in step 445 after receiving the execution assignments in step 442. User feedback can be optionally received in step 450, where the optional feedback can include a change to one or more user-configured testing parameters.

When changes are provided in feedback, step 455 can execute where modified user configured parameters can be determined and conveyed to the test execution plan generation tool. A new plan can be generated based on the modified parameters, as indicated by proceeding from step 455 to step 410.

In step 460, a determination as to whether previous versions of a newly generated test execution plan exist. If so, an optional analysis of the differences between the test plan versions can occur in step 465. Further, risks, benefits, ratings, and other data can be identified and associated with each of the different test plan versions, as shown by step 470. In step 475, analysis results, test plan differences, and related data can be presented to a responsible test administer. At any point, additional user feedback can be received in step 450, which can result in a generation of a new test execution plan, which is generated based upon modified testing parameters. The method 400 can repeat from the beginning for different software packages under test.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for automatically generating test execution plans comprising:
   a plurality of user-configured testing parameters defining testing requirements for a software application under test to be evaluated within a software testing system, wherein at least one testing objective for a software application is defined by the user-configurable testing parameters, wherein the plurality of user-configured testing parameters comprises at least four of a name of the software application under test, a version of the software application under test, a test type, a testing environment, a name of a software tester, a skill set of an unnamed software tester, a name of a component of the software application under test, a test coverage value, a testing start date, and a test duration;
   a predefined test execution plan data model defining a plurality of testing metadata for generating a test execution plan for the software application under test, wherein the plurality of testing metadata is representative of a plurality of software testing domain data for the software testing system, said testing metadata specifying details of finite shared resources of a test center shared by all projects under test, wherein said generated test execution plan details specific allocation of the finite shared resources dedicated towards at last one phase of testing the software application to satisfy the at least one testing objective for the software application; and
   a test execution plan generation tool configured to automatically generate the test execution plan for the software application under test utilizing the plurality of user-configured testing parameters and the predefined test execution plan data model, wherein each generated test execution plan details specific allocations of the finite shared resources dedicated towards at least one phase of testing the software application to satisfy the at least one testing objective for the software application.

2. The system of claim 1, wherein the test execution plan generation tool further comprises:
   a user interface configured to provide a user interaction mechanism for accepting and presenting data;
   a data processing component configured to synthesize at least one execution assignment for the test execution plan;
   an administrative component configured to provide access to user-configurable system data of the test execution plan generation tool;
   a reporting component configured to generate at least one user-selected report for at least one of the test execution plan, the plurality of user-configured testing parameters, and the test execution plan data model; and
   a data store that is a physical storage medium configured to store the predefined test execution plan data model and each generated test execution plan generated using the test execution plan generation tool.

3. The system of claim 2, wherein the data processing component is further configured to perform data analysis operations upon stored test execution plans.

4. The system of claim 2, wherein the data processing component further comprises:
a rules translator configured to translate the plurality of user-configured testing parameters into at least one generation rule, wherein the at least one generation rule is a representation of a user-configured testing parameter capable of being executed by the test execution plan generation tool upon the predefined test execution plan data model.

5. The system of claim 4, further comprising:
a plurality of customizable generation rule templates accessible from within the user interface having at least one user-defined value for at least one user-configured testing parameter, wherein user-selection of a customizable generation rule template automatically populates the at least one user-configured testing parameter with the at least one user-defined value.

6. The system of claim 2, wherein the reporting component further comprises:
a notification handler configured to convey an electronic notification message to each software tester identified within the test execution plan, wherein said electronic notification message contains the at least one execution assignment for a software tester.

7. A non-transitory computer readable storage medium comprising:
computer usable program code, which is stored in the storage medium, configured to receive a plurality of user-configured testing parameters for a software application under test by a test execution plan generation tool, said text execution plan tool comprising a computer program product stored on a physical medium, wherein the plurality of user-configured testing parameters correlate to at least one item contained in a predefined test execution plan data model, and wherein at least one testing objective for the software application is defined by the user—configurable testing parameters;
computer usable program code, which is stored in the storage medium, configured to automatically generate a test execution plan utilizing the plurality of user-configured testing parameters and a predefined test execution plan data model, wherein the predefined test execution plan data model comprises testing metadata representing software testing domain data for a software testing system being used to evaluate the software application under test, said testing metadata specifying details of finite shared resources of a test center shared by all projects under test, wherein said generated test execution plan details specific allocation of the finite shared resources dedicated towards at last one phase of testing the software application to satisfy the at least one testing objective for the software application, wherein said computer usable code for configured to automatically generate the test execution plan further comprises:
computer usable program code, which is stored in the storage medium, configured to translate the received plurality of user-configured testing parameters into at least one generation rule, wherein the at least one generation rule is categorized as at least one of a data query constraint and a data synthesis constraint;
computer usable program code, which is stored in the storage medium, configured to query the predefined test execution plan data model for at least one testing metadata item applicable to the plurality of user-configured testing parameters;
computer usable program code, which is stored in the storage medium, configured to synthesize the at least one testing metadata item into at least one execution assignment, wherein the at least one execution assignment defines information for at least one testing activity to be performed by an assigned software tester; and
computer usable program code, which is stored in the storage medium, configured to compile the at least one synthesized execution assignment into the test execution plan; and
computer usable program code, which is stored in the storage medium, configured to store the generated test execution plan coupled with the plurality of user-configured testing parameters.

8. The storage apparatus of claim 7, wherein translating of the received plurality of user-configured testing parameters further comprises:
computer usable program code, which is stored in the storage medium, configured to apply a user-defined priority value to the at least one generation rule, wherein said user-defined priority value quantifies a degree of execution precedence for a generation rule; and
computer usable program code, which is stored in the storage medium, configured to adjust an execution order of the at least one generation rule in accordance with user-defined priority values.

9. A system for automatically generating test execution plans comprising:
a computer hardware including a non-transitory storage medium;
a plurality of user-configured testing parameters defining testing requirements for a software application under test to be evaluated within a software testing system, wherein at least one testing objective for a software application is defined by the user-configurable testing parameters;
a predefined test execution plan data model defining a plurality of testing metadata for generating a test execution plan for the software application under test, wherein the plurality of testing metadata is representative of a plurality of software testing domain data for the software testing system, said testing metadata specifying details of finite shared resources of a test center shared by all projects under test, wherein said generated test execution plan details specific allocation of the finite shared resources dedicated towards at last one phase of testing the software application to satisfy the at least one testing objective for the software application; and a test execution plan generation tool configured to automatically generate the test execution plan for the software application under test utilizing the plurality of user-configured testing parameters and the predefined test execution plan data model, wherein each generated test execution plan details specific allocations of the finite shared resources dedicated towards at least one phase of testing the software application to satisfy the at least one testing objective for the software application, wherein the test execution plan generation tool further comprises:
a user interface configured to provide a user interaction mechanism for accepting and presenting data;
a data processing component configured to synthesize at least one execution assignment for the test execution plan;

an administrative component configured to provide access to user-configurable system data of the test execution plan generation tool;

a reporting component configured to generate at least one user-selected report for at least one of the test execution plan, the plurality of user-configured testing parameters, and the test execution plan data model; and a data store that is a physical storage medium configured to store the predefined test execution plan data model and each generated test execution plan generated using the test execution plan generation tool.

10. The system of claim 9, wherein the data processing component is further configured to perform data analysis operations upon stored test execution plans.

11. The system of claim 9, wherein the data processing component further comprises:

a rules translator configured to translate the plurality of user-configured testing parameters into at least one generation rule, wherein the at least one generation rule is a representation of a user-configured testing parameter capable of being executed by the test execution plan generation tool upon the predefined test execution plan data model.

12. The system of claim 9, further comprising:

a plurality of customizable generation rule templates accessible from within the user interface having at least one user-defined value for at least one user-configured testing parameter, wherein user-selection of a customizable generation rule template automatically populates the at least one user-configured testing parameter with the at least one user-defined value.

13. The system of claim 9, wherein the reporting component further comprises:

a notification handler configured to convey an electronic notification message to each software tester identified within the test execution plan, wherein said electronic notification message contains the at least one execution assignment for a software tester.

14. The system of claim 9, wherein the plurality of user-configured testing parameters comprises at least four of a name of the software application under test, a version of the software application under test, a test type, a testing environment, a name of a software tester, a skill set of an unnamed software tester, a name of a component of the software application under test, a test coverage value, a testing start date, and a test duration.

* * * * *